United States Patent [19]
Takeda

[11] Patent Number: 5,860,349
[45] Date of Patent: Jan. 19, 1999

[54] CUTTING APPARATUS EQUIPPED WITH TOOL VARIABLY PRESSED AGAINST WORK DEPENDING UPON WORKING DISTANCE

[75] Inventor: Koshiro Takeda, Shizuoka, Japan

[73] Assignee: Yamaha Corporation, Shizuoka-ken, Japan

[21] Appl. No.: 878,480

[22] Filed: Jun. 19, 1997

Related U.S. Application Data

[63] Continuation of Ser. No. 524,047, Sep. 6, 1995, abandoned.

[30]     Foreign Application Priority Data

Sep. 9, 1994     [JP]     Japan ................................ 6-216074

[51] Int. Cl.⁶ ...................................................... B26D 3/08
[52] U.S. Cl. ............................... 83/881; 83/886; 83/887; 83/76.6
[58] Field of Search ............................ 83/881, 880, 884, 83/886, 887, 76.1, 76.6, 76.7, 76.8; 225/96.5, 96; 125/13.01, 29

[56]                 References Cited

U.S. PATENT DOCUMENTS

| | | | |
|---|---|---|---|
| 3,577,636 | 5/1971 | DeTorre | 83/886 X |
| 3,756,104 | 9/1973 | Bier et al. | 83/881 |
| 3,760,997 | 9/1973 | Bier | 83/881 X |
| 3,797,339 | 3/1974 | Pape et al. | 83/886 |
| 3,821,910 | 7/1974 | Tjaden | 83/881 |
| 3,865,673 | 2/1975 | DeTorre | 225/96.5 X |
| 3,880,028 | 4/1975 | Frederick, Jr. | 83/880 |
| 4,057,184 | 11/1977 | Michalik | 83/880 X |
| 4,096,773 | 6/1978 | DeTorre | 83/881 |
| 4,104,939 | 8/1978 | Bonaddio | 83/886 X |
| 4,170,159 | 10/1979 | McNally | 83/883 X |
| 4,171,657 | 10/1979 | Halberschmidt et al. | 83/886 |
| 4,226,153 | 10/1980 | Insolio | 83/881 |
| 4,291,824 | 9/1981 | DeTorre | 83/880 X |
| 4,356,944 | 11/1982 | Cotton | 225/98 X |
| 4,392,404 | 7/1983 | Schwarzenberg et al. | 83/881 X |
| 5,038,654 | 8/1991 | Mackey | 83/881 X |
| 5,054,355 | 10/1991 | Tisse et al. | 83/884 X |

FOREIGN PATENT DOCUMENTS 9321119   10/1993   WIPO .

*Primary Examiner*—M. Rachuba
*Attorney, Agent, or Firm*—Ostrolenk, Faber, Gerb & Soffen, LLP

[57]             ABSTRACT

A cutting apparatus presses a wheel cutter against a ceramic plate for cutting it along a cutting line, and a controlling unit determines the total cutting length so as to increase the pressure against the ceramic plate together with the total cutting length, thereby keeping the depth of cutting trail constant.

6 Claims, 8 Drawing Sheets

CUTTING APPARATUS EQUIPPED WITH TOOL VARIABLY PRESSED AGAINST WORK DEPENDING UPON WORKING DISTANCE

This is a continuation of application Ser. No. 08/524,047 filed on Sep. 6, 1995, now abandoned.

FIELD OF THE INVENTION

This invention relates to a cutting apparatus and, more particularly, to a cutting apparatus equipped with a cutting tool which is pressed against a brittle work of ceramic or glass with a variable pressure which is dependent upon running time of the cutting tool.

DESCRIPTION OF THE RELATED ART

A typical example of the cutting apparatus or "scriber" for cutting a workpiece such as glass plate and a ceramic plate is shown in FIG. 1. The prior art scriber largely comprises a working table structure 1, a cutter wheel 2, a driving system 3 for the cutter wheel 2 and a controlling system 4 for the driving system 3.

The working table structure 1 includes a rigid base 1a, a movable table 1b movable in Y-direction with respect to the rigid base 1a and a driving mechanism (not shown) for moving the movable table 1b under the control of the controlling system 4. A ceramic plate workpiece 5 is mounted on the movable table 1b, and is moved together with the movable table 1b in the Y-direction.

The cutter wheel 2 is supported by a suitable retainer 2a, and the retainer 2a is functionally connected to the driving system 3. The driving system 3 includes a slider 3a and a servo-motor (not shown), and moves the retainer 2a and, accordingly, the cutter wheel 2 in X-direction with respect to the rigid base 1a.

As shown in FIG. 2, the controlling system 4 includes a pusher or cylinder 4a provided for the retainer 2a and a pneumatic control sub-system 4b. A cylinder 4c, a plunger 4d movable in the cylinder 4c and a return spring 4e form in combination the pusher, and the retainer 2a is connected to the leading end of the plunger 4d. The plunger 4d is bi-stable, and projects from and retracts into the cylinder 4c.

The pneumatic control sub-system 4b is connected to a high-pressure air source 4f, and includes a combination unit 4g of air filter and pressure regulator, a separator 4h and a solenoid-operated three-port valve 4i. The three ports are labeled with "P", "A" and "R", and the solenoid 4j and a return spring 4k change the connection between the three ports "P", "A" and "R". The high-pressure air is supplied to the inlet port "P", and the outlet port "A" is connected to the cylinder 4C. The port "R" is open through a silencer 4m to the air.

When current is supplied to the solenoid 4j, the return spring 4k connects the outlet port "A" to the port "R", and the solenoid-operated three-port control valve 4i discharges the high-pressure air from the cylinder 4c through the silencer 4m to the air. The plunger 4d retracts into the cylinder 4c, and the retainer 2a and, accordingly, cutter wheel 2 are spaced from the ceramic plate 5.

On the other hand, when a controller (not shown) energizes the solenoid 4j, the electro-magnetic force changes the connection from port "A"-to-port "R" to port "P"-to-port "A". Then, the high-pressure air is supplied to the cylinder 4c, and the plunger 4d projects from the cylinder 4c. The cutter wheel 2 is pressed against the ceramic plate 5.

The pneumatic sub-system 4b further includes a manually-operated pressure reducer 4n for regulating the high pressure air to an appropriate value and a pressure switch 4o for monitoring the air pressure. When an operator manipulates the pressure reducer 4n, the manually-operated pressure reducer 4n regulates the high-pressure air to a new value, and the pressure applied to the plate 4p of the cylinder 4a is changed depending upon the regulated air pressure. Since the force that the cutter wheel 2 is applied to the ceramic plate 5 is a direct function of the pressure applied to the plate 4p, the force applied to the ceramic plate also increases proportionately.

When the air pressure is unintentionally decreased below a critical value due to, for example, air source failure, the pressure switch 4o supplies an alarm signal to the controller (not shown), and the controller informs an operator of emergency state.

The prior art scriber thus arranged encounters a problem in that the cut surface of the ceramic plate 5 is deteriorated with running time of the cutter wheel 2. The reason for the deterioration is derived from the abrasion of the cutter wheel 2. Particularly, while the cutter wheel 2 is cutting a ceramic plate, the depth of the groove cut by the cutter wheel 2 becomes more and more shallow as the total cutting length cut by the cutter wheel 2 increases as shown in FIG. 3. [A groove may extend part way into the workpiece or may cut all the way through the workpiece.] The high pressure air in the cylinder 4c is at a constant pressure P1, and the depth of the groove cut by the cutter wheel 2 is proportional to the force applied by the cutter wheel 2 to the ceramic plate 5. The force applied to the ceramic plate 5 and, accordingly, the depth of the groove cut by the cutter wheel 2 are decreased as a function of the running time or the total length cut by the cutter wheel 2 as indicated by Plot PL1. Thus, the depth of the groove cut by the cutter wheel 2 is decreased, and the cutting surface is deteriorated.

Of course, if the cutter wheel 2 is replaced with a new cutter wheel upon reaching the limit P3 of the allowable depth range dP, the cutting surface is good. However, the running hours of the cutter wheel 2 is short, and, accordingly, the frequent replacement increases the running cost of the prior art cutting apparatus.

In order to improve the cutting surface without sacrifice of the running cost, an operator may step-wise increase the air pressure on plate 4p from P1 to P0 as indicated by Plot PL2 in FIG. 4. The depth of the groove cut by cutter wheel 2 is repeated within the allowable range dP as indicated by plot PL3, and the service time of the cutter wheel 2 is prolonged to L2. However, the operator is expected to periodically check the depth of the groove cut by cutter wheel 2 and exactly regulate the air pressure. This monitoring work is not easy, and the operator sometimes forgets to check. This results in unexpected deterioration of the cutting surface.

Another prior art cutting apparatus is equipped with a pneumatic control sub-system 14 shown in FIG. 5. The pneumatic control sub-system 14 has three paths 14a, 14b and 14c arranged in parallel between the pressure switch 4o and the solenoid-operated three-port control valve 4i. However, the other components are similar to the prior art pneumatic control sub-system 4b shown in FIG. 2.

The three paths 14a, 14b and 14c have respective pressure reducers 14d, 14e and 14f and respective solenoid-operated two-port control valves 14g, 14h and 14i, and the pressure reducers 14d, 14e and 14f are regulated to different values between P1 and P0. The solenoid-operated two-port control valves 14g, 14h and 14i are electrically connected to the controller (not shown), and one of the solenoid-operated two-port control valves 14g, 14h and 14i couples the associated pressure reducer to the solenoid-operated three-port control valve 4i.

The controller selectively energizes the solenoids of the two-port control valves 14g, 14h and 14i, and increases the air pressure supplied to the solenoid-operated three-port control valve 4i. Then, the depth of the groove cut by cutter wheel 2 traces plot PL3 without the manipulation of the pressure regulator by an operator. However, the pneumatic control sub-system 14 is complicated, and the installation cost is high. Moreover, the pressure reducers 14d, 14e and 14f are the manually-operated type, and the operator is expected to exactly set the pressure reducers 14d, 14e and 14f to appropriate values. The manual regulation is necessary for a different ceramic plates, and the operator sometimes forgets it.

SUMMARY OF THE INVENTION

It is therefore an important object of the present invention to provide a cutting apparatus which is simple and low in running/installation costs.

To accomplish the object, the present invention automatically varies the pressure against a workpiece as a function of the total cutting length of grooves formed in one or more workpieces by a single tool.

In accordance with the present invention, there is provided a cutting apparatus for cutting a work, comprising: a tool provided for the work; a pressor for pressing the tool against the work at a pressure; a drive causing relative motion between the tool and the work for producing movement of the tool relative to the work; a measurer for measuring the length of the movement of the tool across the work; and a controller for increasing the pressure as a function of the length of the movement of the tool across the work.

BRIEF DESCRIPTION OF THE DRAWINGS

The features and advantages of the cutting apparatus according to the present invention will be more clearly understood from the following description taken in conjunction with the accompanying drawings in which.

DESCRIPTION OF THE PREFERRED EMBODIMENT

Figure 1:
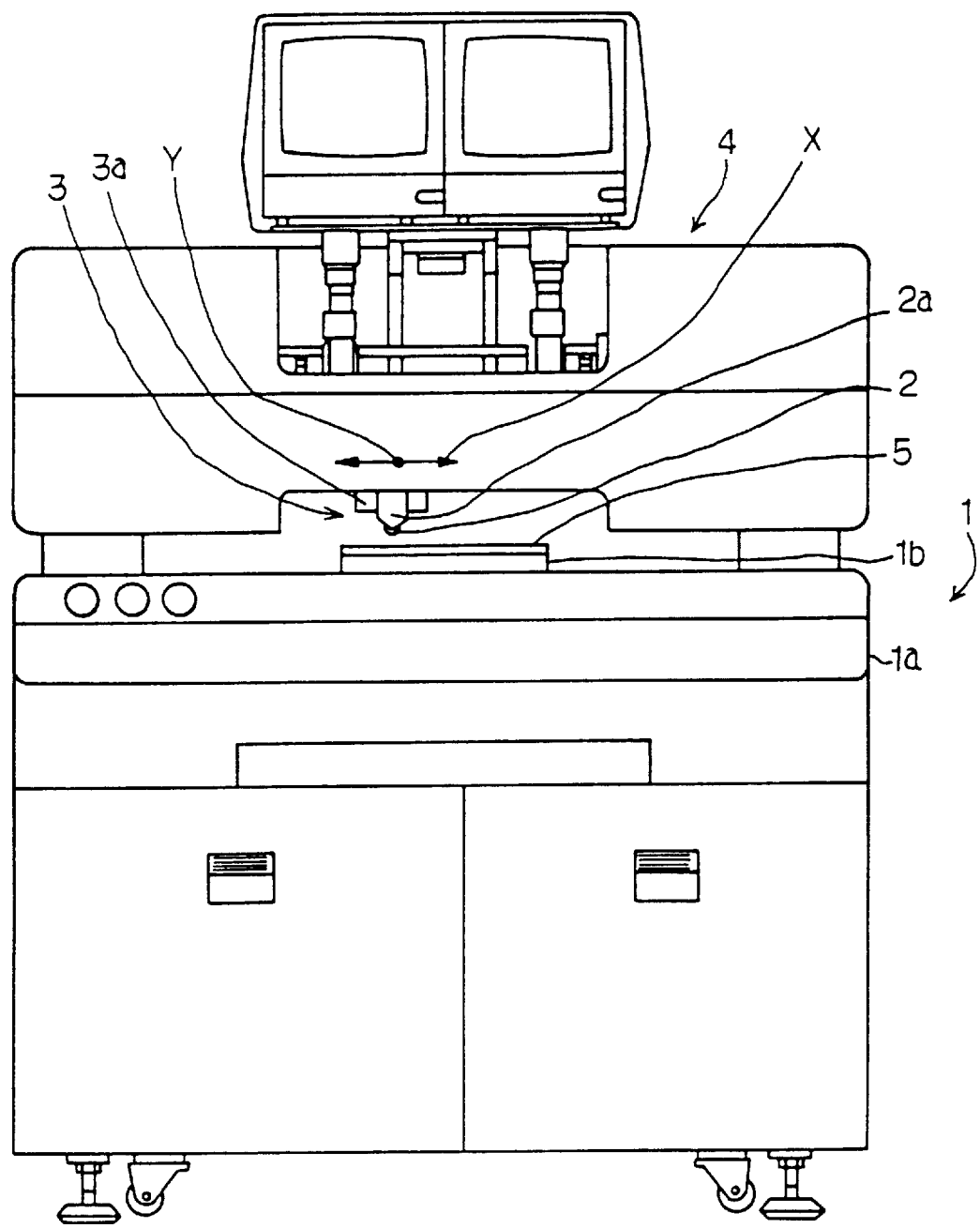
FIG. 1 is a front view showing the prior art scriber.
Figure 2:
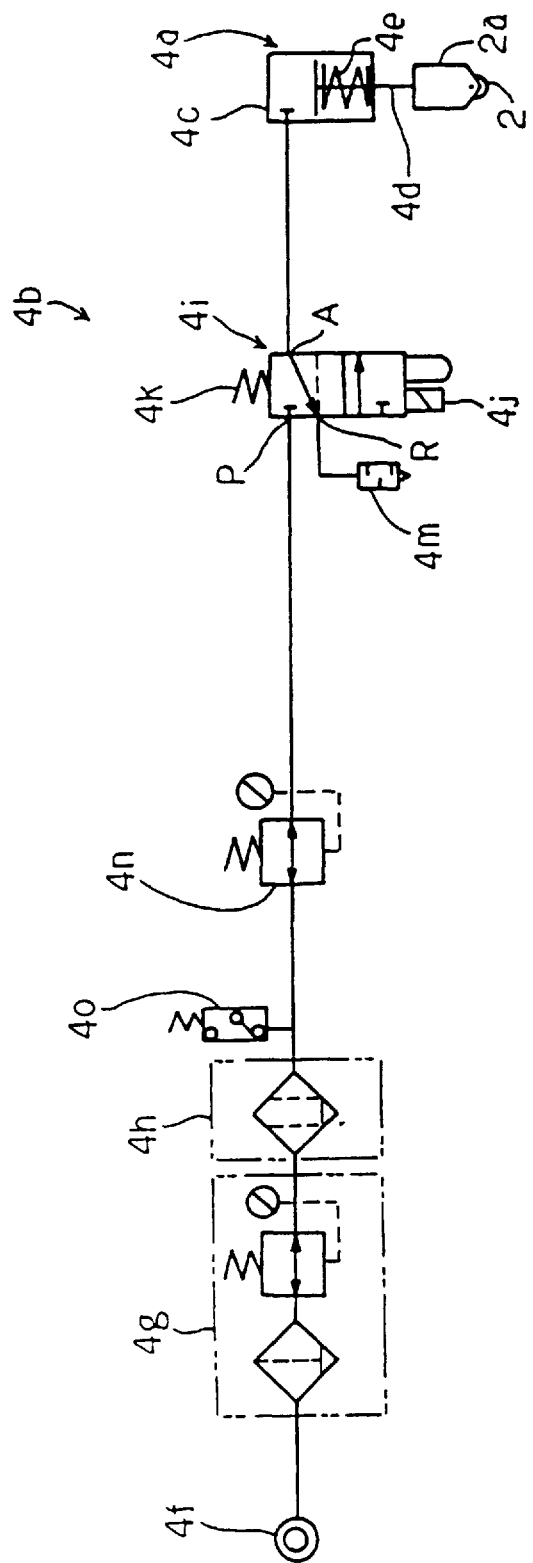
FIG. 2 is a block diagram showing the pneumatic subsystem incorporated in the prior art scriber.
Figure 3:
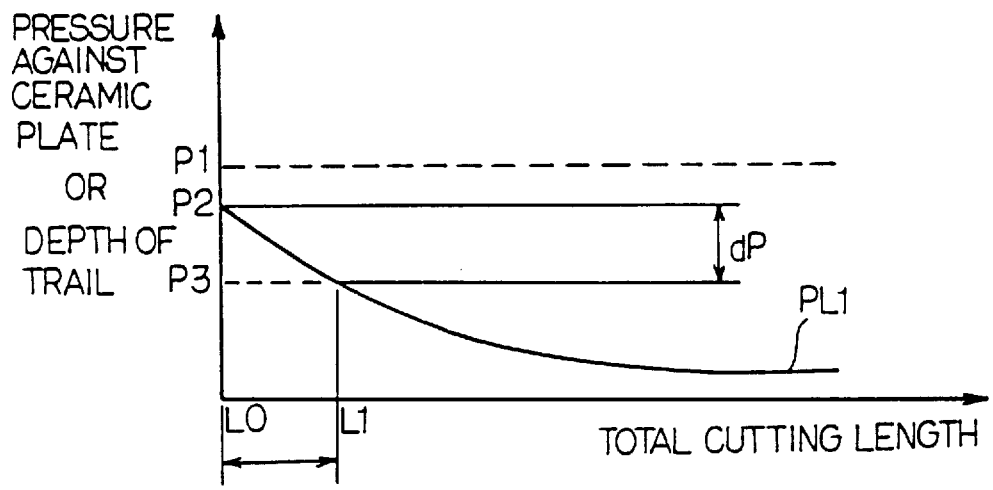
FIG. 3 is a graph showing the depth of the grooves formed in one or more workpieces by the cutter wheel in terms of the total cutting length without regulation of the air pressure.
Figure 4:
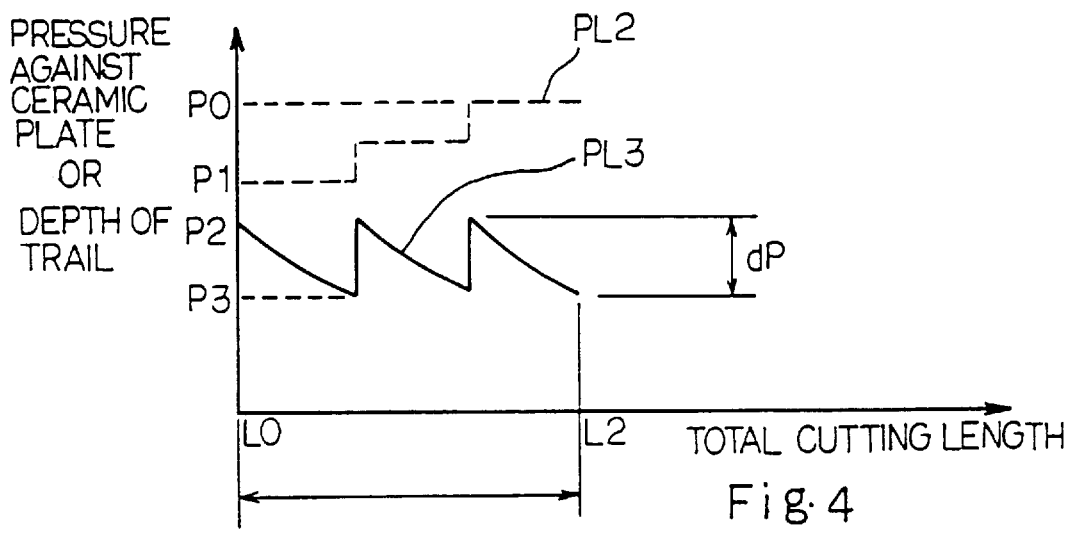
FIG. 4 is a graph showing the depth of the grooves formed in one or more workpieces by the cutter wheel in terms of the total cutting length under the regulation of the air pressure.
Figure 5:
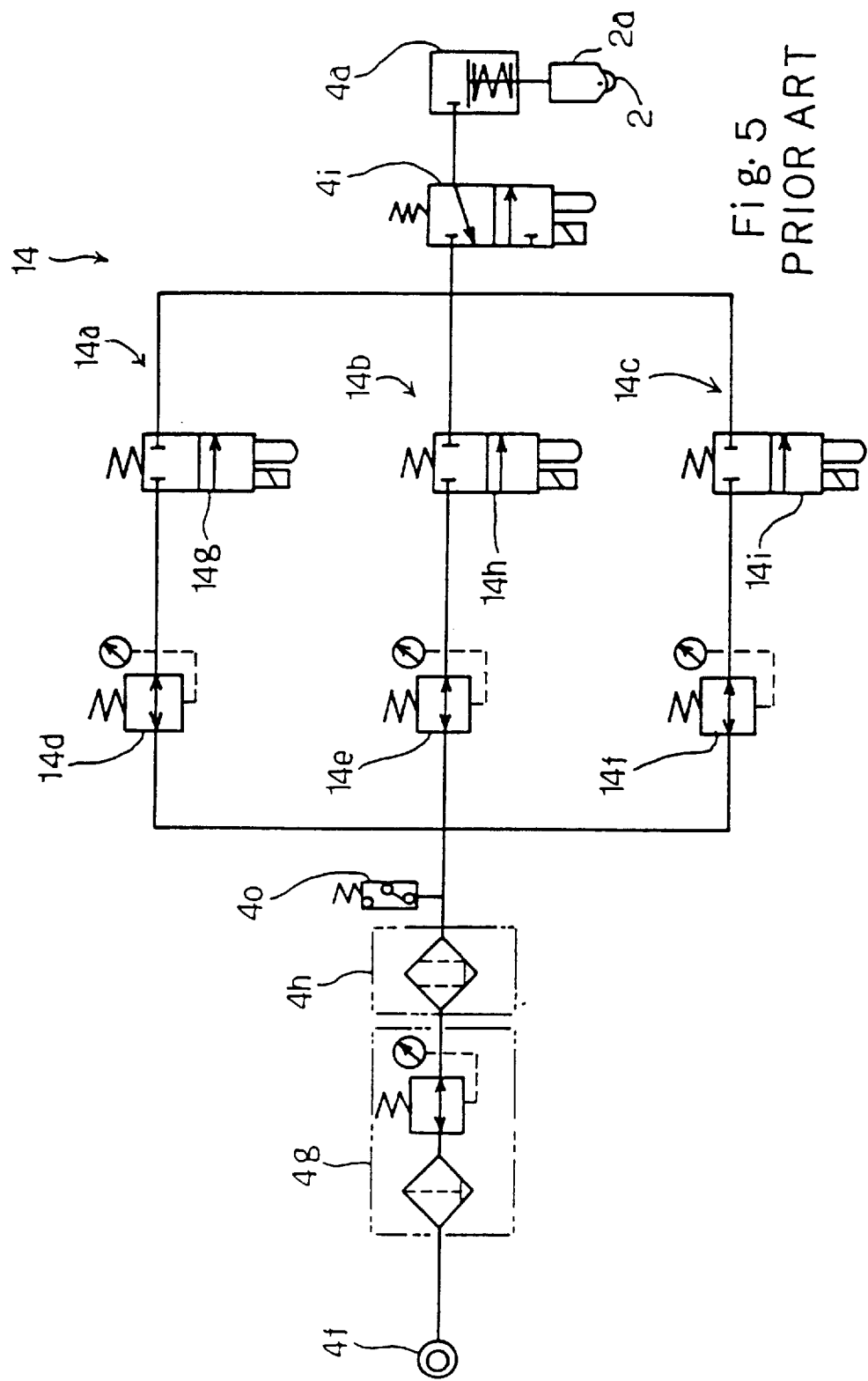
FIG. 5 is a block diagram showing the pneumatic control sub-system incorporated in the other prior art scriber.
Figure 6:
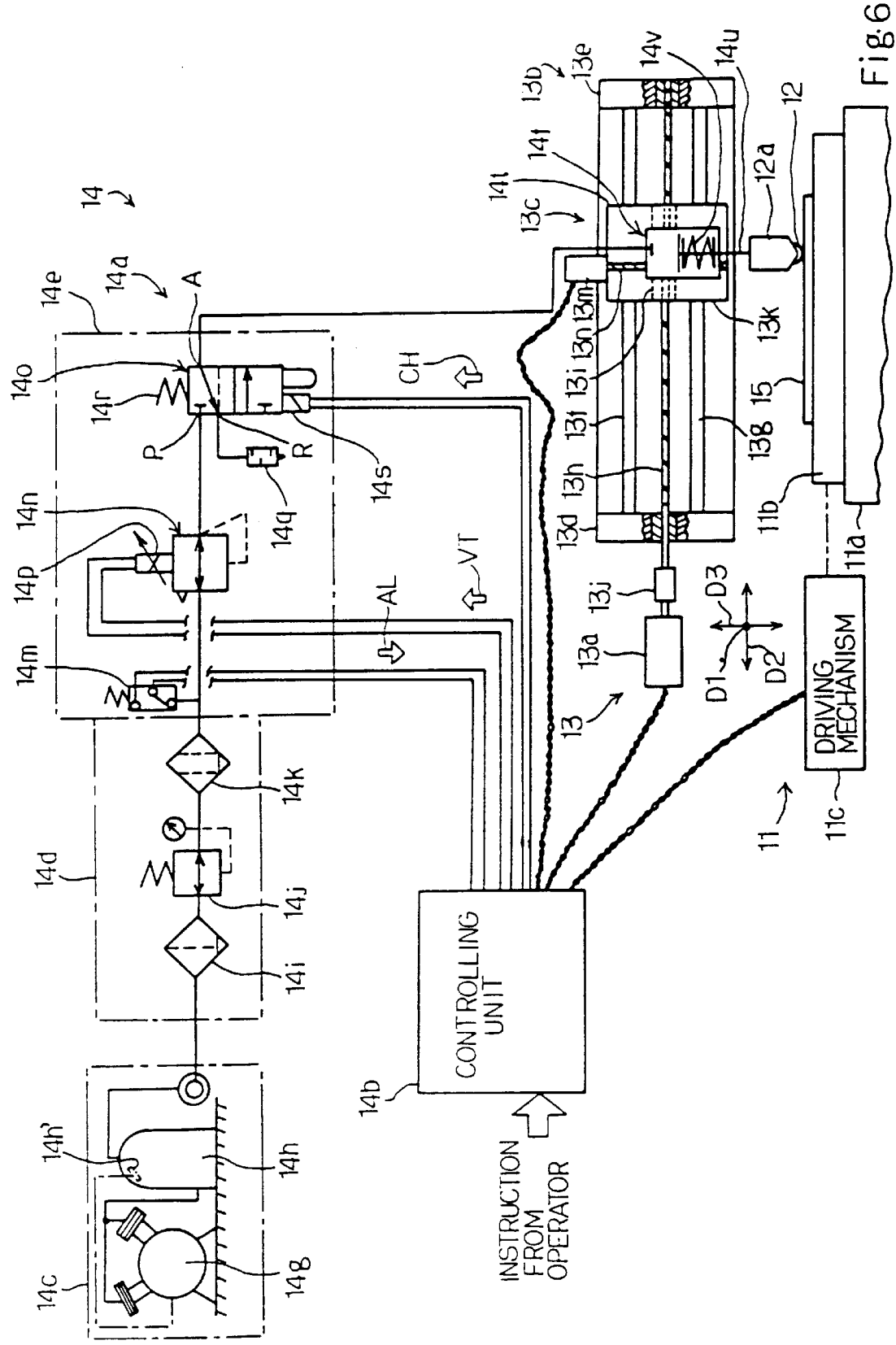
FIG. 6 is a block diagram showing a cutting apparatus according to the present invention.

Referring to FIG. 6 of the drawings, a cutting apparatus embodying the present invention largely comprises a working table structure 11, a cutter wheel 12, a driving system 13 for the cutter wheel 2 and a controlling system 14.

The working table structure 11 includes a stationary rigid bed 11a, a movable table 11b movable in a direction D1 with respect to the stationary rigid bed 11a and a driving mechanism 11c for moving the movable table 11b. The combination of an electric motor, a reduction gear unit and a pinion/rack may form the driving mechanism 11c. The direction D1 is perpendicular to the plane of the paper of FIG. 6 and to directions D2 and D3.

The cutter wheel 12 is supported by a retainer 12a, and is freely driven for rotation around an axis (not shown). The cutter wheel 12 is a sintered product of artificial diamond powder. The retainer 12a and, accordingly, the cutter wheel 12 are associated with the driving system 13, and are moved in the directions D3 and D2, respectively.

The driving system 13 includes a servo-motor unit 13a, a stationary frame structure 13b and a rotation-to-linear motion converting mechanism 13c.

The stationary frame structure 13b is provided over the working table structure 11, and is constituted by bracket members 13d and 13e and two guide rods 13f and 13g. The bracket members 13d and 13e are spaced apart from each other by a distance not shorter than the length of the movable table 11b, and the guide rods 13f and 13g extend in parallel between the bracket members 13d and 13e.

A ball thread unit serves as the rotation-to-linear motion converting mechanism 13c. Namely, a male screw rod 13h, a female screw block 13i and balls (not shown) form the ball thread unit, and the male screw rod 13h is assembled with the female screw block 13i in in-phase manner. Though not shown in the drawings, the balls are inserted into the spiral gap between the male screw rod 13h and the female screw block 13i, and are circulated in the spiral gap. The male screw rod 13h is rotatably supported by the two bracket members 13d and 13e, and is connected to the shaft of the servo-motor unit 13a by means of a suitable coupling unit 13j. A movable bracket 13k is fixed to the female screw block 13i, and is slidable on the guide rods 13f and 13g in the direction D2.

While the servo-motor unit 13a is bi-directionally rotating the male screw rod 13h in one direction, the movable bracket 13k slides on the guide rods 13f and 13g toward the bracket 13d and vice versa.

The driving system 13 further includes an electric motor unit 13m and a rotation-to-linear motion converting unit 13n provided between the electric motor unit 13m and a cylinder 14t supported by the movable bracket 13k. The rotation-to-linear motion converting unit 13n is similar to the rotation-to-linear motion converting unit 13h/13i, and no further description is incorporated hereinbelow for avoiding repetition.

While the electric motor unit 13m is rotating, the cylinder 14t is moved in the direction D3, and presses the cutter wheel 12 against or spaces it from a work piece (ceramic plate 15) located on the movable table 11b.

The controller system 14 includes a pneumatic control sub-system 14a and a controller unit 14b, and the controller unit 14b directly controls the driving mechanism 11c, the rotation-to-linear motion converting mechanisms 13C, 13N and the pneumatic control sub-system 14a through a data processing. Though not shown in the drawings, a data processor, a program storage, a data storage and an signal interface are incorporated in the controller unit 14b, and the data processor executes instructions supplied from the program storage as will be described in detail in conjunction with a cutting operation on the ceramic plate 15.

The pneumatic control sub-system includes a high pressure air source section 14c, a pre-treatment section 14d, a controller section 14e and an actuator section 14f. An air compressor unit 14g and a reservoir tank 14h form in combination the high pressure air source section 14c, and supplies high-pressure air to the pretreatment section 14d. When the air pressure in the reservoir tank 14h reaches an upper limit, the air compressor unit 14g interrupts the air compressing. However, if the air pressure in the reservoir tank 14h is lowered to a lower limit, a pressure switch 14h' detects the low pressure, and instructs the air compressor unit 14g to restart the operation. Thus, the high-pressure air source section 14c supplies the high-pressure air between the higher limit and the lower limit to the pre-treatment section 14d.

The pretreatment section 14d contains an air filter 14i, an air pressure regulator 14j and a separator 14k. The air filter 14i eliminates dust from the high-pressure air, and the air pressure regulator 14j keeps the air pressure constant.

The controlling section 14e contains a pressure switch unit 14m, a voltage-to-air pressure converting valve unit 14n and a solenoid-operated three-port control valve unit 14o. The pressure switch unit 14m monitors the high-pressure air supplied from the pretreatment unit 14d, and generates an alarm signal AL which indicates that the actual air pressure is lower than a critical level. The alarm signal AL is supplied to the controlling unit 14b.

The voltage-to-air pressure converting valve unit 14n is responsive to a potential signal (a control signal) VT indicative of a target value of the high-pressure air so as to cause the actual air pressure to reach the target value. A solenoid 14p is incorporated in the voltage-to-air pressure converting valve unit 14n, and generates electro-magnetic force in the presence of the potential signal VT. The electro-magnetic force is variable with the voltage level of the potential signal VT, and changes a throttle (not shown) for changing the air pressure at the outlet port thereof. The throttle is further controlled in such a manner as to keep the air pressure to the target value regardless of the amount of air flow. The potential signal VT is step-wise variable, and, accordingly, the voltage-to-air pressure converting valve unit 14n can step-wise vary the actual air pressure. In an actual control, the step of the potential variation is so narrow that the voltage-to-air pressure converting valve unit increases the air pressure as if it traces a linear line.

The solenoid-operated three-port control valve unit 14o has an inlet port P, an outlet port A and discharge port R. The inlet port R is connected to the outlet port of the voltage-to-air pressure converting valve unit 14n, and the outlet port A is connected to the actuator 14f. The discharge port R is open through a silencer 14q to the air. The solenoid-operated three-port control valve unit 14o is bi-stable. Namely, a return spring 14r causes the outlet port A to be connected to the discharge port R in the absence of a change-over control signal CH supplied form the controlling unit 14b. However, when the change-over control signal CH is supplied to a solenoid 14s, the inlet port P is connected to the outlet port A, and the high-pressure air is transferred from the voltage-to-air pressure converting valve unit 14n to the actuator 14f.

The cylinder 14t, a plunger 14u and a return spring 14v constitute the actuator 14f. The outlet port A is connected to the cylinder 14t, and supplies the high-pressure air to the inner chamber of the cylinder 14t. The plunger 14u is slidably accommodated in the inner chamber of the cylinder 14t, and the retainer 12a is connected to the leading end of the plunger 14u. The plunger 14u is urged by the return spring 14v, and projects from and retracts into the inner chamber depending upon the pressure in the inner chamber of the cylinder 14t.

The retainer 12a is moved together with the plunger 14u in the direction D3, and the cutter wheel 12 is pressed against or spaced from a ceramic plate 15 mounted on the movable table 11b.

In this instance, the cutter wheel 12 supported by the retainer 12a serves as a tool, and the actuator 14t behaves as the pressing unit. The servo-motor 13a, the stationary frame structure 13b, the rotation-to-linear motion converting unit 13c and the coupling unit 13j as a whole constitute a driving unit. The high-pressure source section 14c, the pre-treatment section 14d and the controller section 14e form in combination a controller unit, and a measuring unit, which is a data processing unit, is implemented by the controller unit 14b as will be understood hereinbelow.

Assuming now an operator fixes the ceramic plate 15 to the movable table 11b, the driving mechanism 11c aligns the cutter wheel 12 with an imaginary cutting line on the ceramic plate 15. The controller unit 14b instructs the servo-motor unit 13a to move the bracket 13k to a starting point over the right of the ceramic plate 15. Although the air compressor unit 14g has stored the high-pressure air in the reservoir tank 14h, the controller unit 14b does not supply the change-over control signal CH to the solenoid 14s, and the solenoid-operated three-port control valve unit 14o conducts the atmospheric pressure to the inner chamber of the cylinder 14f. For this reason, the return spring 14v causes the plunger 14u to retract into the inner chamber, and the wheel cutter 12 is spaced from the ceramic plate.

When the operator instructs the controller unit 14b to start the cutting operation on the ceramic plate 15, the controller unit 14b minimizes the potential level of the potential signal VT, and instructs the voltage-to-air pressure converting valve unit 14n to regulate the actual air pressure to the minimum target value.

Figure 7:
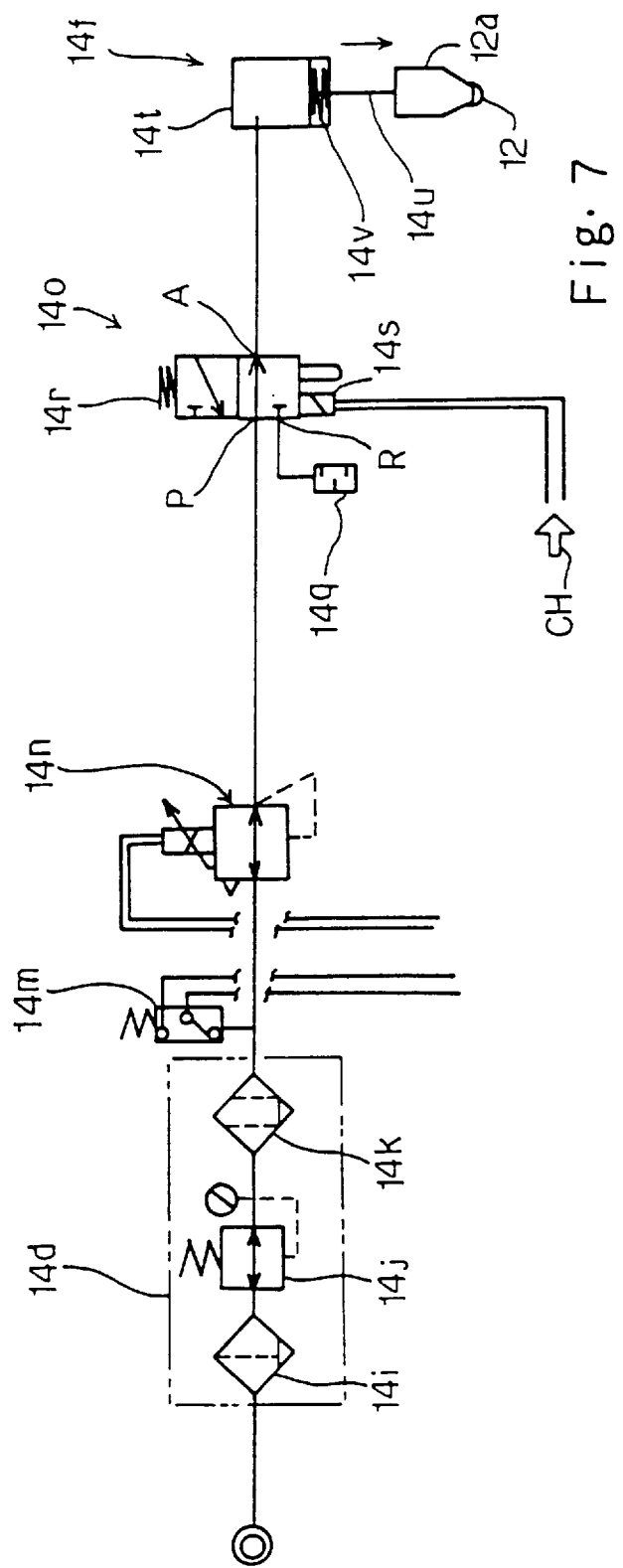
FIG. 7 is a block diagram showing a pneumatic control sub-system incorporated in the cutting apparatus.

Subsequently, the controller unit 14b supplies the change-over control signal CH to the solenoid 14s, and the solenoid-operated three-port control valve unit 14o connects the inlet port P to the outlet port A as shown in FIG. 7. Then, the high-pressure air is supplied through the solenoid-operated three-port control valve unit 14o to the inner chamber of the cylinder 14t. The plunger 14u projects from the cylinder 14t, and presses the cutter wheel 12 against the right end of the cutting line on the ceramic plate 15 at the minimum pressure.

The controller unit 14b instructs the the servo-motor unit 13a to rotates the male screw rod 13h. The rotation-to-linear motion converting unit 13c moves the movable bracket 13k and, accordingly, the actuator 14f and the cutter wheel 12 along the cutting line toward the left end of the ceramic plate 15. The cutter wheel 12 cuts the ceramic plate along the cutting line, and a groove is cut in the ceramic plate 15.

When the wheel cutter 12 reaches the left end on the cutting line, the controller unit 14b instructs the serve-motor unit 13a to stop the rotation, and the movable bracket 13k and the cutter wheel 12 terminate at the left end on the cutting line. The controlling unit 14b removes the change-over control signal CH from the solenoid 14s. Then, the cutter wheel 12 stops the rotation, and the return spring 14r causes the outlet port A to the discharge port R to be conducted. Then, the high-pressure air is discharged from the inner chamber of the cylinder 14t through the solenoid-operated three-port control valve unit 14o and the silencer 14q to the atmosphere.

The return spring 14v causes the plunger 14u to retract into the cylinder, and the cutter wheel 12 is spaced from the ceramic plate 15.

Thus, the cutting apparatus repeats the cutting operation on ceramic plates 15.

When the cutter wheel 12 is replaced with new one, the data processor resets an internal register of the data storage to zero. While the cutter wheel 12 is cutting along the cutting line, the data processor increments (keeps track of) the total length of the trail (the groove(s) cut by cutter wheel 12), and checks the total length of the trail to determine the potential level of the voltage signal VT.

Figure 8:
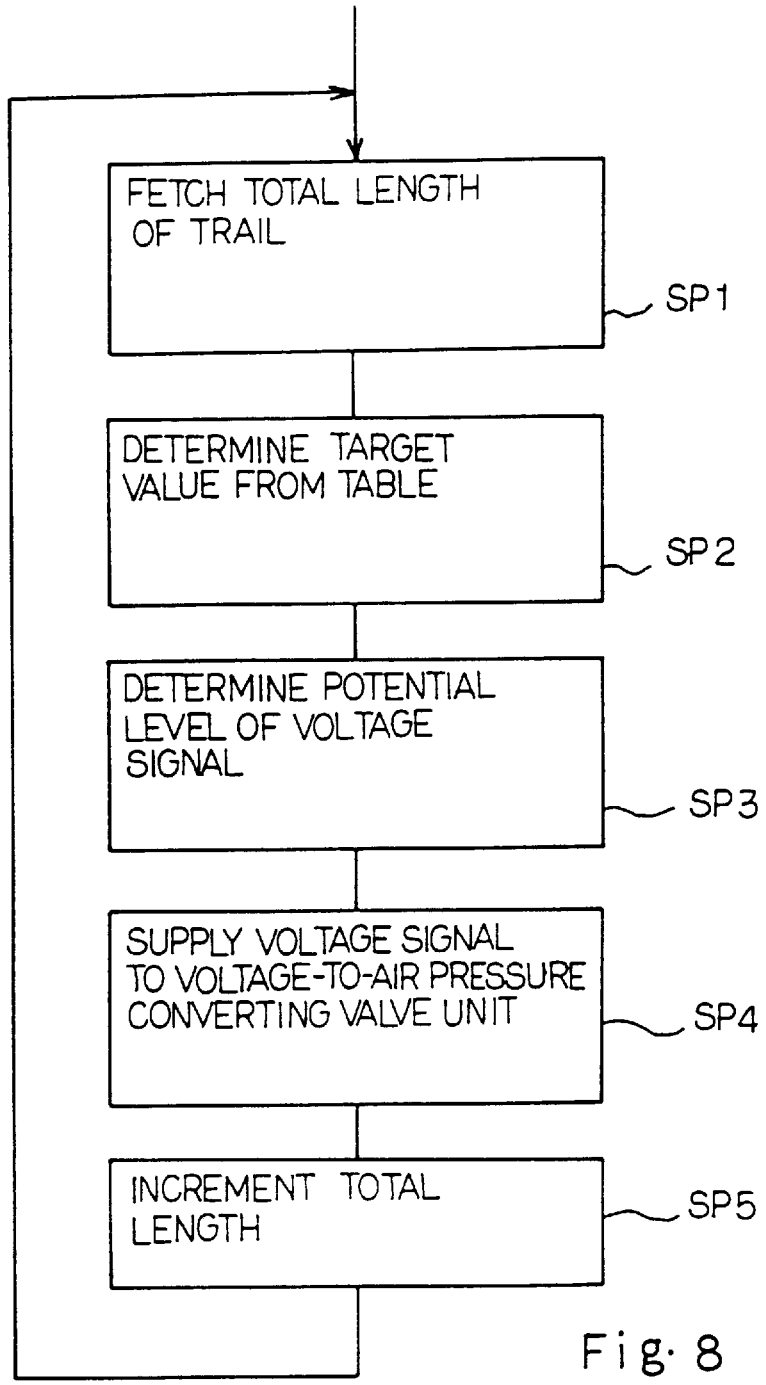
FIG. 8 is a flow chart showing a control sequence for the cutting apparatus.

In detail, the data processor executes a main routine program, and controls the driving mechanism 11c, the driving system 13 and the controller system 14 for cutting or scribing the ceramic plate 15. In order to control the controller system, the data processor repeats a routine shown in FIG. 8 during the cutting operation. First, the data processor fetches the data indicative of the total length of the trail stored in the internal register in step SP1, and compares the total length of the trail with a table defining the relationship between the total length of the trial and the target value of the high-pressure air applied to the cylinder 14t. The table is stored in the data device. The table divides the length of the trail into narrow ranges, and associates the narrow ranges with different target values, respectively. However, the target value is varies as if it traces a linear line as described hereinbefore.

The data processor determines the target value through the comparison with the table as by step SP2, and instructs a signal generator to regulate the voltage signal VT to the potential level indicative of the target value as by step SP3.

The data processor allows the signal generator to supply the voltage signal VT to the voltage-to-air pressure converting valve unit 14n as by step SP4, and increments the total length of the trail as by step SP5.

Thus, the data processing unit reiterates the loop consisting of steps SP1 to SP5 until the service life of the wheel cutter 12 is expired.

The total length of the trail is measured as follows.

If a numerical control is employed, the data processing unit calculates the total length on the basis of the control data for the numerical control.

If the cutting line is constant, the data processing unit multiplies the length of the cutting line by the number of repetition so as to determine the total length of the trail.

A revolution meter such as an encoder plate is fixed to the shaft supporting the wheel cutter 12, and the number of the rotations is reported to the data processing unit. The data processing unit multiplies the circumference of the wheel cutter by the number of rotations so as to determine the total length of the trail.

Figure 9:
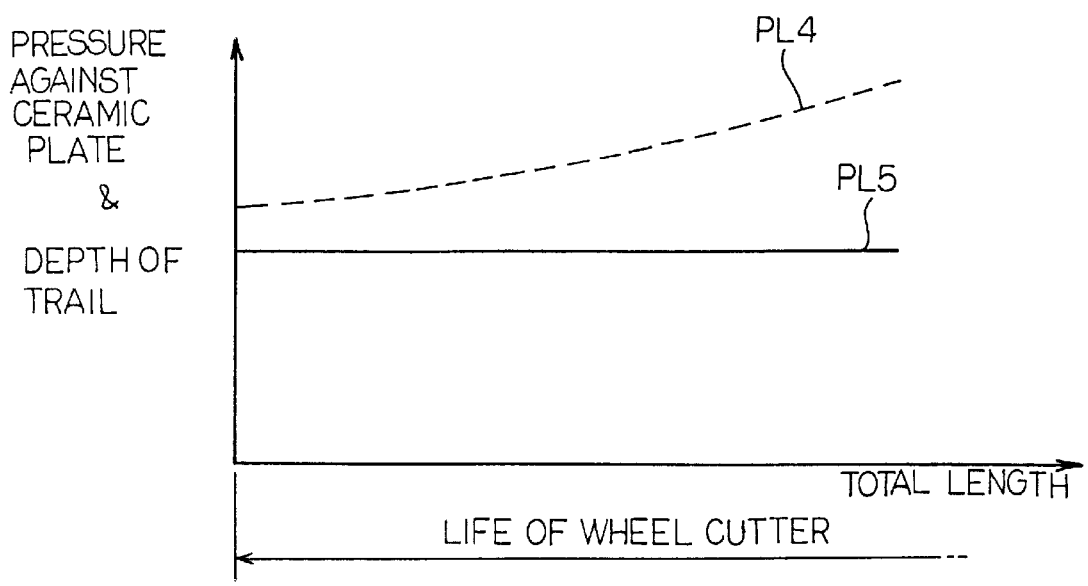
FIG. 9 is a graph showing the depth of a grooves formed in one or more workpieces by the cutter wheel in terms of the total cutting length under the control of a controlling system incorporated in the cutting apparatus.

Thus, the controlling unit 14b renews the total length of the trail, and varies the target value of the high-pressure air. As a result, the air pressure applied to the actuator 14f, and therefore the force of the cutter wheel 12 against the ceramic plate 15, is increased as a function of the length of the trail as indicated by plot PL4, and the depth of the trail is maintained at constant as indicated by plot PL5 (see FIG. 9). This results in a constant cutting surface, and prolongs the life of the wheel cutter 12. Moreover, the controlling unit 14b changes the target value for the high-pressure air, and the wheel cutter 12 is exactly controlled without an error.

While the cutting apparatus is carrying out the cutting operation on the ceramic plate 15, the high-pressure air is assumed to become lower than the critical value, the pressure switch 14m produces the alarm signal AL, and supplies the alarm signal AL to the signal interface of the controlling unit 45b. The controlling unit acknowledges the emergency state, and removes the change-over control signal CH from the solenoid 14s. Then, the solenoid-operated three-port control valve 14o conducts the outlet port A to the discharge port R, and the high-pressure air is evacuated from the inner chamber of the cylinder 14t to the atmosphere. As a result, the return spring 14v causes the plunger 14u to retract into the cylinder 14t, and the wheel cutter 12 is spaced form the ceramic plate 15. The controlling unit 45b further instructs the servo-motor 13a to stop the rotation, and generate an alarm sign on a display (not shown).

Although particular embodiments of the present invention have been shown and described, it will be obvious to those skilled in the art that various changes and modifications may be made without departing from the spirit and scope of the present invention.

For example, an electric circuit and a solenoid-operated actuator may be used instead of the pneumatic control sub-system 14a and the actuator 14f.

Moreover, the driving mechanism may rotate the movable table so as to carry out a position control in a rotational coordinates. The wheel cutter may be replaced with a scriber, and may be rotated by a motor unit.

What is claimed is:

1. A cutting apparatus for cutting a workpiece, comprising:
   a tool for cutting a trail in said workpiece;
   a pressing unit for pressing said tool against said workpiece;
   a driving unit moving said tool relative to said workpiece for causing said tool to cut said trail in said workpiece; and
   a controller, including a measuring unit for measuring a length of said trail, for controlling the operation of said pressing unit and causing said pressing unit to increase a pressure at which said tool is pressed against said workpiece in response to a signal from said measuring unit.

2. The cutting apparatus as set forth in claim 1, in which said tool is a cutter wheel.

3. The cutting apparatus as set forth in claim 1, in which said pressing unit includes a cylinder having an air chamber, a plunger projecting from said cylinder and moveably mounted relative to said cylinder and a return spring urging said plunger in a direction which retracts said plunger into said cylinder.

4. The cutting apparatus as set forth in claim 1, in which said driving unit includes a motor unit, a stationary frame structure, a bracket supporting said pressing unit, said bracket being movably mounted on said frame structure for linear movement with respect to said frame structure and a rotation-to-linear motion converting unit connected between said motor and said bracket for bi-directionally moving said bracket.

5. The cutting apparatus as set forth in claim 1, in which said controller includes:
   an air source for receiving an input signal and and for generating an air pressure output as a function of said input signal;

a controller unit for generating said input signal as a function of said length of said trail.

6. A cutting apparatus for cutting a workpiece, comprising:
- A) a working table structure including:
  1) a stationary bed,
  2) a movable table for mounting said workpiece, said table being movable with respect to said stationary bed; and
  3) a driving mechanism for moving said movable table with respect to said stationary bed;
- B) a cutter wheel rotatably supported by a retainer for producing a trail in said workpiece during a cutting operation;
- C) an actuator connected to said retainer for pressing said cutter wheel against said workpiece at a pressure;
- D) a driving system moving said retainer and said actuator relative to said workpiece; and
- E) a controller including;
  1) an air source for generating pressurized air;
  2) a pre-treatment section for producing an available high-pressure air from said pressurized air;
  3) a controller unit determining a total length of said trail and producing a control signal which increases with said total length of said trial; and
  4) a controller section having an air pressure converting valve unit responsive to said control signal for regulating said available high-pressure air and supplying said available high-pressure air to said actuator, said actuator being responsive to said available high-pressure air for changing said pressure.

* * * * *